Sept. 6, 1932.  W. S. WATTS  1,876,114

BRAKE

Filed Jan. 9, 1930

INVENTOR.
WILLIAM S. WATTS
BY H. Q. Clayton
ATTORNEY

Patented Sept. 6, 1932

1,876,114

UNITED STATES PATENT OFFICE

WILLIAM S. WATTS, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 9, 1930. Serial No. 419,521.

This invention relates to brakes and is illustrated as embodied in a band type of internally expanding automobile brake.

It is the principal object of this invention to provide in a brake of this type a very simple, cheaply fabricated and yet effective applying means and to this end I have provided a novel two-part floating lever member interposed between the spaced apart ends of the brake, the parts thereof adapted to straddle one end of the band.

A further object of the invention is to so arrange the parts of the lever as to obviate any possible overhang thereof which would result in twisting the lever during operation. This result I have accomplished by positioning the lever, which is preferably bell crank in shape, symmetrical with respect to the brake parts co-operating therewith.

According to another minor but nevertheless important feature of the invention, there is provided a novel double hook or yoke type fitting at one end of a tension element, which fitting is pivotally connected to and adapted to actuate the aforementioned lever.

Further features, including a novel wedging means for increasing the overall length of the band to compensate for lining wear and other desirable details of construction and combinations of parts in the brake and its applying mechanism will be obvious from the following detailed description of a preferred embodiment of my invention disclosed in the accompanying drawing, in which.

Figure 1:
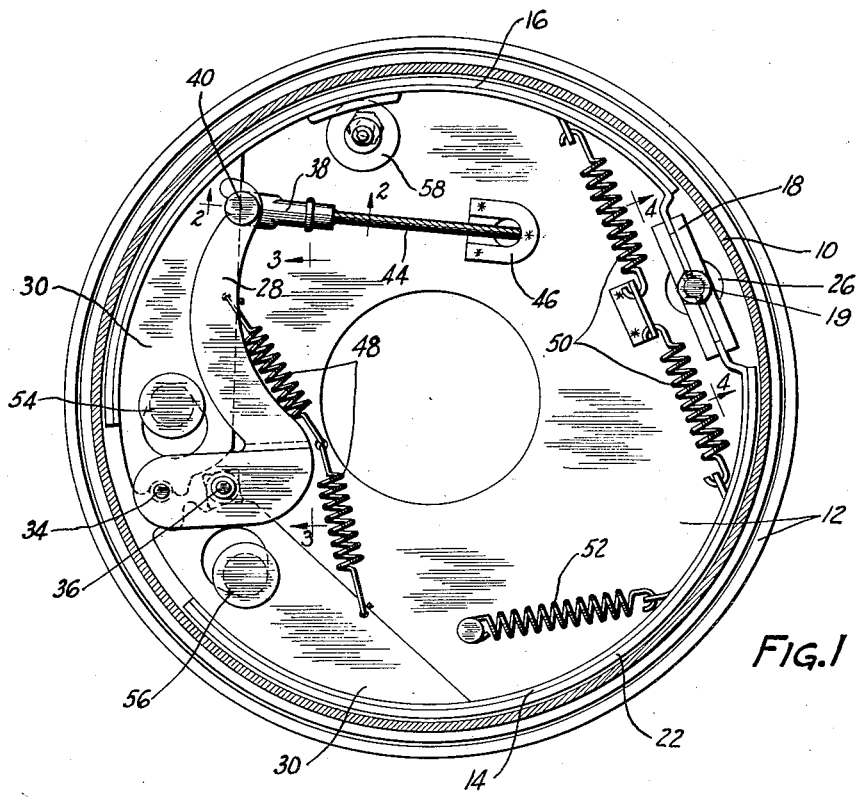
Figure 1 is a side elevation of my novel brake and applying means therefor.

As disclosed in the drawing illustrating the preferred embodiment of my invention, there is provided a rotatable drum 10 within which is mounted my novel brake and applying means therefor supported upon a closure or backing plate 12, the drum and support plate together forming a housing for the brake mechanism. The brake in its essential details comprises annular band sections 14 and 16 adjustably secured together to compensate for lining wear by novel means comprising a wedge-shaped relatively wide head member 18 on a bolt 19, the head co-operating with a correspondingly shaped wedge member 20, which members are transversely slotted at their ends to receive the proximate V-shaped ends of the band members. Wear of the brake lining 22 on the band sections may be compensated for by increasing the overall length of the sections, the same being effected by rotating a nut 24 accessible through an opening 26 in the support plate to thus effect movement of the wedge 20, which is sleeved on the bolt 19, toward the wedge 18. A separation of the band elements of the brake ensues to increase the overall length thereof, maintaining a constant inoperative position of the applying means interposed between the ends of the elements.

According to an important feature of my invention, I have provided a novel applying means to spread apart the ends of the band sections into drum contact. In the preferred embodiment, as disclosed in elevation in Figure 1, there are provided two parallel generally bell crank or L-shaped stampings 28 straddling one of a pair of reinforcing plates 30 extending substantially radially from the ends of the band sections 14 and 16. The stampings are also preferably right-angularly bent inwardly intermediate their ends at 32 and thence extended in parallel relation straddling the ends of the bands and supporting pivots 34 and 36, a roller and a block respectively, which pivots are adapted to contact the spaced apart ends of the reinforcing plates on the band members. A feature of the lever, as disclosed, lies in its being symmetrically arranged with respect to the upper reinforcing web member 30, which it straddles.

Figure 2:
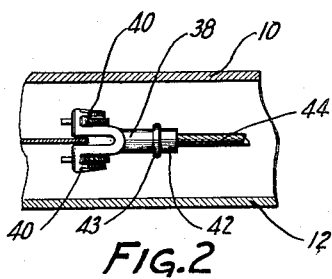
Figure 2 is a partial section through the connection between the fitting and lever on the line 2—2 of Figure 1.
Figure 4:
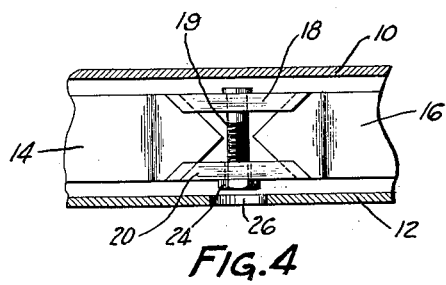
Figure 4 is a section looking in the direction of the arrows 4—4 of Figure 1 disclosing my novel wedge expansion structure.
Figure 3:
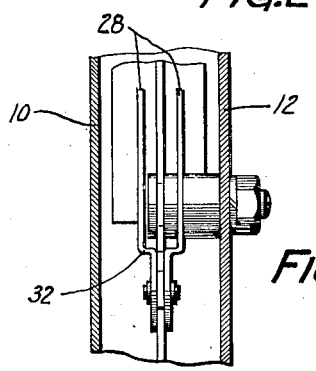
Figure 3 is a section looking in the direction of the arrows 3—3 of Figure 1 disclosing in more detail certain parts of the lever.

According to an important minor feature of the invention, I have provided a novel one-piece fitting 38, as disclosed in detail in Figure 2, said fitting provided with oppositely extending hooked portions 40, which portions, as clearly disclosed in Figures 1 and 2, hook over recessed ends of the parallel lever members. The fitting is slotted in its center to receive the aforementioned web portion of the upper band member and may also be provided with an integral shank member 42 to which is secured, as by an upset 43, a flexible cable tension element 44 extending through the backing or support plate at 46.

It is apparent, therefore, that I have provided an applying lever symmetrically arranged with respect to one end of the braking element, thus obviating any undesirable overhang or moment arm between its connection with the tension element or pull cable, which moment arm would tend to diminish the pulling effect of the tension element in actuating the brake.

In operation, actuation of the tension element 44 serves to rock the bell crank lever to spread apart the band brake elements into drum contact against the resistance of return springs 48, 50 and 52 secured to the support plate and band elements. Depending upon the direction of drum rotation, the band elements function as a unit by virtue of the aforementioned rigid adjustable wedge connection, anchoring on one or the other of anchor posts 54 and 56 secured to the backing plate. With release of the brake under the action of the return springs, the latter being more completely disclosed and described in a co-pending application of Ludger E. La Brie and Adolph Rosner, filed September 11, 1929, Serial No. 391,714, the brake is centered in its inoperative position by virture of the eccentric adjustable stop member 58 and the aforementioned anchor members 54 and 56. It is to be emphasized that, with the brake applied, a line bisecting a line joining the points of contact of the pivot thrust members 34 and 36 with the ends of the band sections and normal thereto, passes through the point of connection between the novel double hook fitting and the lever end. This feature is not claimed herein, being also the invention of Ludger E. La Brie and Adolph Rosner, as described in the aforementioned application. A balanced application of forces is thus transmitted to the respective ends of the band and, with the novel arrangement disclosed, the entire applying effect of the tension element is transmitted direct to the ends of the band to apply the same.

While one particular embodiment of my invention has been described in detail, it is not my intention to limit the scope of the invention to that particular embodiment or otherwise than by the terms of the appended claims.

The novel adjustment herein described, while not claimed in this application, forms the subject matter of my divisional application Serial No. 601,634, filed March 28, 1932.

I claim:

1. A brake including, in combination with an annular friction device having separable ends, a floating lever member having parallel body sections straddling a reinforcing means secured to one of said ends, said lever member also having parallel body portions interposed between and straddling said separable ends.

2. A brake including, in combination with an annular friction device having separable ends, a floating lever member comprising juxtaposed parallel stampings straddling the ends of said friction device and also straddling a reinforcing means secured to one end of said friction device, together with means for actuating said lever member including a joint structure symmetrically arranged with respect to said reinforcing means and lever member.

3. Actuating means for an internal expanding brake including a two-part bell crank lever member having juxtaposed parallel parts at one end thereof pivotally supporting thrust members interposed therebetween, said parallel members extending outwardly away from each other and thence extending in parallel relation to form the other end of said lever.

4. In an applying means for a brake mechanism, a two-part lever member having parallel juxtaposed body members recessed at one end thereof, together with a double hook-shaped fitting for a tension element, the hooks of said fitting adapted to be positioned within the aforementioned recesses in the ends of said lever member.

5. A fitting adapted to be incorporated in a brake actuating mechanism comprising a one piece member having a shank portion at one end thereof and provided at the other end with oppositely extending hook-shaped members, together with a recessed portion in said fitting intermediate said members.

In testimony whereof, I have hereunto signed my name.

WILLIAM S. WATTS.